Patented Dec. 19, 1922.

1,439,285

UNITED STATES PATENT OFFICE.

MILTON F. BEECHER, OF WORCESTER, MASSACHUSETTS, ASSIGNOR TO NORTON COMPANY, OF WORCESTER, MASSACHUSETTS, A CORPORATION OF MASSACHUSETTS.

SAFETY-TREAD TILE.

No Drawing. Application filed April 6, 1921, Serial No. 459,182. Renewed May 3, 1922. Serial No. 558,314.

*To all whom it may concern:*

Be it known that I, MILTON F. BEECHER, a citizen of the United States of America, residing at Worcester, in the county of Worcester and State of Massachusetts, have invented certain new and useful Improvements in Safety-Tread Tiles, of which the following is a full, clear, and exact specification.

My invention relates to safety treads and more particularly to anti-slipping tread blocks or tiles which have high anti-slipping and wear-resisting properties.

It has been proposed to make safety treads by embedding silicon carbide grains in concrete and similar plastic setting materials, but owing to the smoothness of the grains and the lack of chemical combinations between the silicon carbide and the embedding magma, the abrasive granules are not held securely in place under the abrasions of traffic and so do not form a permanently anti-slipping surface. It has also been proposed to incorporate isolated grains of silicon carbide in sintered and vitrified ceramic blocks in which the ceramic material comprises the main body of the article and the grains are merely embedded therein, but such blocks offer only moderate resistance to slippage of footgear and are short lived as safety treads.

It is desirable, in order to make a satisfactory safety tread tile, that the silicon carbide grains be bonded together into a porous mass which will present not only the sharp corners of the grains themselves but also the cutting edges of pores for impeding the slipping of footgear thereon. In order to provide this porous condition, the grains should be united by ceramic materials which have been softened sufficiently to cause the bond to cling to the surfaces of the grains and leave open pore spaces therebetween, the bond being in insufficient quantity to fill the pores. It is found, however, that silicon carbide tends to oxidize slightly at ceramic kiln temperatures when in the presence of various fused clay materials. Hence it is not desirable to employ bonding materials which become fused to a condition of low viscosity and which are capable of attacking the silicon carbide.

It is accordingly an object of my invention to overcome such disadvantages and provide a porous safety tread tile of ceramic bonded silicon carbide which will be durable, wear-resisting and retain its abrading anti-slipping characteristics for an indefinite period of time. Other objects will be apparent in the following disclosure.

In accordance with this invention, I provide a safety tread tile by bonding silicon carbide granules of suitable size with a ceramic bonding material of a porcelainic nature which is heated to the stage of vitrescence, but below the completely fused glassy state. As a suitable bonding medium, I propose to utilize a fine grained plastic refractory clay of a good color which fuses above the temperature of the ceramic firing operation and which will not react deleteriously upon the silicon carbide. I preferably utilize a clay of the ball clay type which fuses above cone 26. In order to modify the bonding properties of the ball clay and cause the bond to have the proper viscosity at a desired temperature of firing and so produce the porcelainic condition, I combine therewith various ingredients, such as feldspar and flint, in desired proportions, which depend upon the size of the grains and the hardness and bond strength desired in the tile. Such a porcelainic bond may be made up in the following proportions:

Feldspar_____ 60 to 75% by weight.
Ball clay_____ 40 to 25% by weight.
Flint_____ 0 to 15% by weight.

A specific composition for one type of tile may be made up of the following ingredients:

Silicon carbide_____ 67% by weight.
Bond_____ 33% by weight.

*Bond composition.*

Feldspar_____ 65%
Mississippi ball clay_____ 35%

Since the abrasive and non-slip qualities of the tile, as well as its porosity and other physical characteristics, will depend upon the size of the grains, I obviously may modify these within wide limits, provided the silicon carbide grains form the major portion of the tile volume and the structure is open and capable of absorbing at least 5% of its weight of water. A tile best adapted for my purposes has a low porosity, as indicated by a water absorption of from 5% to 10%. In the specific example given, I preferably utilize 10% of each of the grain sizes which will just pass through screens of 36, 46, 60, 70, 80, 90, 100, 120, 150 and 180 meshes to the linear inch. A tile made of these proportions and grain sizes will have a durable and firmly bonded structure with a water absorption of from 8 to 10%, which is well adapted for use where the maximum anti-slipping qualities are desired.

My tile may be made in accordance with suitable ceramic operations. The ingredients selected in accordance with the above example may be mixed with a desired quantity of water to render the mass plastic and workable or capable of being formed in a dry press. The material is then molded to the desired shape and dried slowly until the water is substantially removed therefrom; after which the article may be fired in a ceramic kiln at a temperature approximating cone 12 for a sufficient period of time to vitrify the bond to the vitrescent stage and beyond the initial stages of vitrification but not to the point of being vitreous or glassy. In this condition the bonding materials flow to some extent and unite because of surface tension with the surfaces of the crystalline grains, thus forming posts or webs between the grains where they are adjacent one another and leaving the larger interstices open as pores. Under these conditions the silicon carbide grain is not attacked and will not oxidize to any material extent and so cause detrimental swelling and distortion of the tile which would be otherwise had.

Having thus described my invention, what I claim as new and desire to secure by Letters Patent is:

1. A safety tread tile comprising silicon carbide granules united into an integral porous mass with a porcelainic bond, the grains forming the major portion of the tile surface of the article.

2. A safety tread tile comprising silicon carbide grains integrally united by a porcelainic bond which has been fired to the vitrescent stage but is not glassy, said crystalline grains constituting substantially the whole body of the tile and being united by the bond into a porous structure.

3. A safety tread tile comprising silicon carbide grains and a porcelainic bond therefor, said grains being in assorted sizes ranging from coarse to fine to form a dense structure and constituting the major portion of the volume of the tile, and said porcelainic bond, proportioned to produce a porous body with a water absorption of between 5% and 10%, having been fired to the vitrescent but non-glassy stage.

Signed at Worcester, Massachusetts, this 5th day of April, 1921.

MILTON F. BEECHER.

Witness:
HAROLD R. SAVAGE.